(No Model.)
J. PARKER & M. L. GUNNING.
APPARATUS FOR CUTTING AND BEVELING FLEXIBLE AND ELASTIC MATERIALS.
No. 358,067. Patented Feb. 22, 1887.
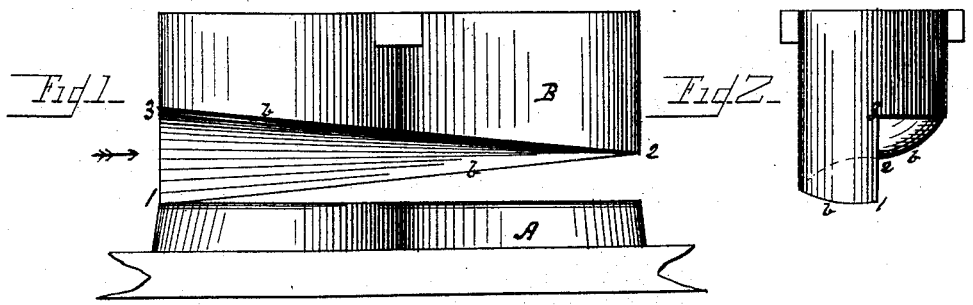
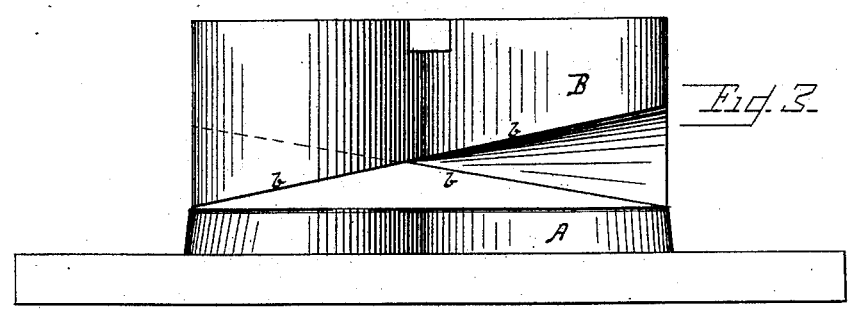
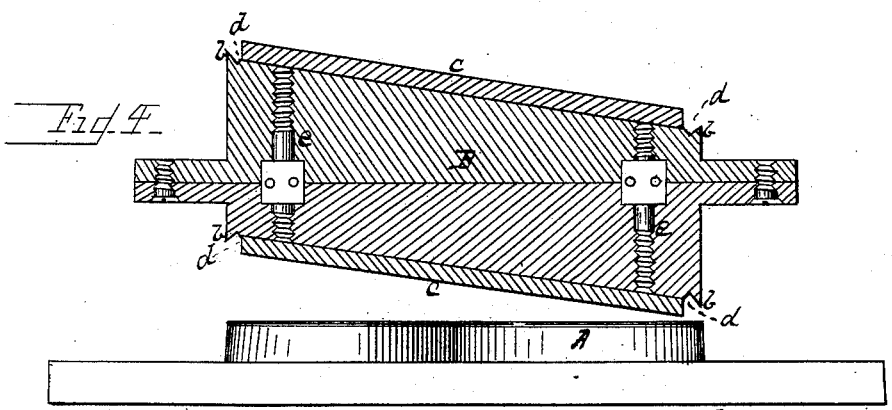
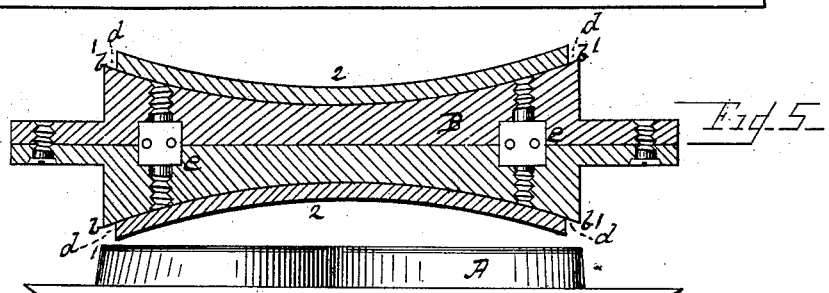
Witnesses
G. A. Taubesschmidt
Edwin S. Clarkson
Inventors
Jonas Parker
Mark L. Gunning
By their Attorney
F. W. Ritter Jr.

UNITED STATES PATENT OFFICE.

JONAS PARKER AND MARK LUTHER GUNNING, OF WILLIAMSPORT, PENNSYLVANIA, ASSIGNORS OF PART TO GEORGE SNYDER BANGER, CHARLES ADELBERT BOWMAN, AND HARRY PARKER, ALL OF SAME PLACE.

APPARATUS FOR CUTTING AND BEVELING FLEXIBLE AND ELASTIC MATERIALS.

SPECIFICATION forming part of Letters Patent No. 358,067, dated February 22, 1887.

Application filed December 15, 1886. Serial No. 221,688. (No model.)

*To all whom it may concern:*

Be it known that we, JONAS PARKER and MARK LUTHER GUNNING, both residing at Williamsport, in the county of Lycoming and State of Pennsylvania, have invented certain new and useful Improvements in Apparatus for Cutting and Beveling Flexible and Elastic Material; and we hereby declare the following to be a full, clear, and exact description of the same, reference being had to the accompanying drawings, wherein—

Figure 1 is a side elevation of a spiral edge or screw-shaped die-block and die or cutter embodying our invention. Fig. 2 is an end view of the same, looking in the direction of the arrow, Fig. 1. Fig. 3 is an elevation of one modification thereof, showing a double spiral incline, the rear incline indicated by dotted lines. Fig. 4 is a sectional view of a second modification, showing the inclines from end to end, the inclines being the same on both sides of the die-block. Fig. 5 is a sectional view of a third modification, the inclines being from the ends to the center, like the arc of a circle.

Like letters refer to like parts wherever they occur.

Our present invention relates to the construction of a die-block or cutter-block which coacts with a die or cutter for the purpose of cutting out blanks from flexible or elastic material—such as rubber, leather, pasteboard, &c.—and at one and the same operation beveling the edge or edges of said blanks, and is to a certain extent an improvement on the invention described in our former application, Serial No. 206,237, filed June 25, 1886.

In our former invention the die-block or cutter-block was provided with a raised central face recessed or beveled at the periphery and having an outer cutting-edge, so that the material was bent or curved over the edges of the die-block and severed by a cut oblique or inclined to the surface of the material; but in said invention the edges of the cutter-block or die-block which coacted with the cutter or die in severing the material were all in one and the same horizontal plane, so as to make an instant or simultaneous cut all around the blank. This we have found in practice causes loss of power in operating the machine and brings an excessive and unnecessary strain on both the machinery and the material operated on.

The object, therefore, of the present invention is to obtain a scissors or shear cut, whereby power is saved, the machine rendered light-running, the machine and material operated on relieved of strain, and all liability of distorting the material or forming defective blanks avoided.

To this end it consists, broadly stated, in forming the reciprocating die-block or cutter-block—which is to coact with the die or cutter—with a sloping or inclined edge, so that the cuts shall not be simultaneous at all points, but a continuously progressive cut, and also in employing in conjunction therewith the raised central face of the die-block, all as will hereinafter more fully appear.

So far as the machinery for operating or reciprocating the die-block or cutter-block for feeding the material to the die-block and die and for removing the blanks when cut is concerned, it may be of the character described in our former application, Serial No. 206,237, hereinbefore referred to, or any other known devices adapted to the purpose, as the same forms no part of the present invention.

We will now proceed to describe the preferred form of our invention more specifically, so that others skilled in the art to which it appertains may apply the same.

In the drawings, A indicates the bed-die or cutter, which may be of the desired form or pattern for the blanks to be produced; and B, the cutter-block.

In the present instance we have chosen the form of a shoe-sole for purposes of illustration, as our invention is more especially adapted to cutting and beveling blanks for rubber soles; but we do not intend thereby to limit ourselves to that or any other particular form of cutter and die-block.

The cutter or die A will be the usual beveled blade, of such internal diameters as will permit the entrance of the reciprocating die-block or cutter-block B. The die-block or cutter-block B is of similar form to and dimensions with the interior of the cutter or die A, with which it coacts, and is formed with an outer inclined or sloping cutting-edge, $b$, which may be a spiral or screw form, as shown in Fig. 1, a double spiral, as shown in Fig. 3, a continuous incline from end to end or side to side of the cutter-block, as illustrated in Fig. 4, or a double incline meeting at the transverse center of the die-block or cutter-block, like the arc of a circle, as shown in Fig. 5, and in either case the die-block B, as it enters the die or cutter A, will sever the blank by a progressive or shearing cut, which will neither strain nor distort the material nor rack the machine.

The die-block or cutter-block may have a raised face, $c$, and the circumferential recess or bevel $d$, so as to bend or curve the material and cause the cut to be oblique or inclined to the surface of the material operated on, so as to bevel the blank at the time it is cut, and said raised central faces (or plates) $c$ may be rendered adjustable by means of the right and left hand threaded screws $e$, if desired.

The rim $b$ of die-block B may also, if desired, be ground back toward the adjustable block or plate $c$, to form a knife-edge for rim $b$. (See Fig. 4.)

The devices, being substantially of the character hereinbefore specified, will operate as follows: In case of the spiral shown in Fig. 1 the cutter-block, as it forces the material over its face and into the cutter A, will commence to cut at the leading edge of the cutter-block, (indicated by 1,) and the cut will gradually advance to the point 2, and then back to the point 3, encircling the blank progressively with a shear or scissors cut, while in Fig. 3 it will advance from two opposite points, each cut terminating where the other commenced. In Fig. 4 the cut will be from one end to the other of the die-block with a shear or scissors cut, and in the case of the die-block shown in Fig. 5 the cut will advance from the two ends 1 1, and along both sides, with a shear cut until the cuts meet at the center 2.

The advantages of our present invention are, first, that less power is required to operate the reciprocating cutter-block or die-block, and the machinery therefor is subjected to less strain and shock; secondly, the material operated on is subjected to less strain or drawing; and, thirdly, the liability of producing distorted or imperfect blanks from elastic material is obviated.

We do not herein claim, broadly, a die-block or cutter-block having a raised face, $c$, and recess $d$, or a cutter-block having an adjustable raised central face-plate, $c$; but, Having thus set forth the nature, advantages, and operation of our invention, what we claim, and desire to secure by Letters Patent, is—

1. In a machine for cutting and beveling blanks from flexible or elastic material, the combination, with a die or cutter, of a die-block or cutter-block having the spirally-inclined cutting-edge for producing an uninterrupted or continuously progressive cut around the entire blank, substantially as and for the purposes specified.

2. In a machine for cutting and beveling blanks from flexible or elastic material, the combination, with a die or cutter, of a die-block or cutter-block having an inclined or sloping cutting-edge and a raised inclined central face, substantially as and for the purposes specified.

In testimony whereof we affix our signatures, in presence of two witnesses, this 14th day of December, 1886.

JONAS PARKER.
MARK LUTHER GUNNING.

Witnesses:
H. M. PARKER,
DANIEL E. IRVIN.